United States Patent [19]

Roesch et al.

[11] 3,916,127

[45] Oct. 28, 1975

[54] AUTOMATIC INERTIA ELECTRIC CIRCUIT-BREAKER

[76] Inventors: Carol Roesch, 6, Chemin du Wolflock; Rene Heinimann, 42, rue du Tir, both of Colmar, France

[22] Filed: May 29, 1973

[21] Appl. No.: 364,284

[30] Foreign Application Priority Data

June 5, 1974 France .............................. 72.20539

[52] U.S. Cl. .............................. 200/61.45; 200/61.5
[51] Int. Cl. ........................................... H01h 35/14
[58] Field of Search... 200/61.45 R, 61.53, DIG. 29, 200/61.5

[56] References Cited
UNITED STATES PATENTS

| | | | |
|---|---|---|---|
| 2,056,494 | 10/1936 | Tucker, Jr. et al. | 200/61.45 R |
| 2,291,236 | 7/1942 | Kilgour | 200/61.5 X |
| 2,949,783 | 8/1960 | Butler | 200/61.45 R X |
| 3,466,409 | 9/1969 | Pernet | 200/61.45 R |
| 3,743,803 | 7/1973 | Roesch et al. | 200/61.5 X |
| 3,745,277 | 7/1973 | Shawcross et all. | 200/61.5 |
| 3,798,399 | 3/1974 | Corporandy | 200/61.5 X |

Primary Examiner—James R. Scott
Attorney, Agent, or Firm—Young & Thompson

[57] ABSTRACT

The disclosure is of a circuit-breaker suitable for use in a vehicle and adapted to function automatically to interrupt the circuit from the battery of the vehicle if the latter suffers a shock or impact, the circuit-breaker comprising a sealed insulating housing in which is mounted an inertia weight which can be displaced by a horizontal shock force from any direction and thereby releases a conducting contact plate which is moved by springs so as to break the circuit, characterised in that the re-setting knob is fixed to an intermediate piece provided with an annular channel in which engage the extremities of lever fingers pivotally mounted by means of pivots in the housing.

5 Claims, 7 Drawing Figures

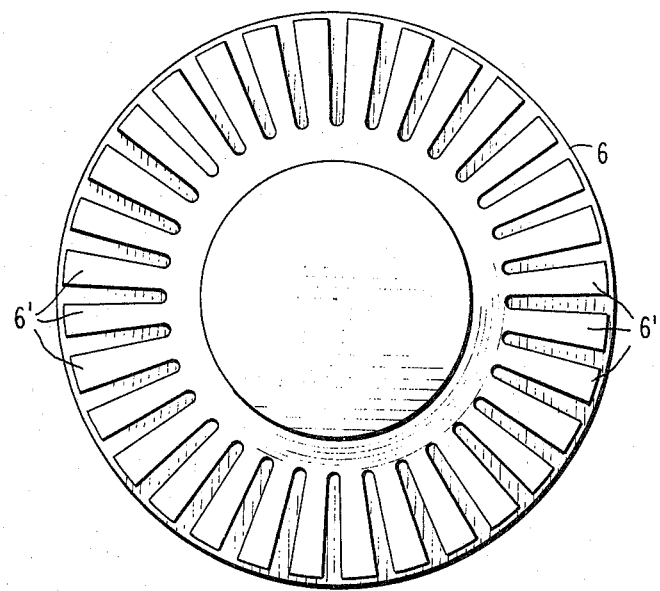
FIG.5
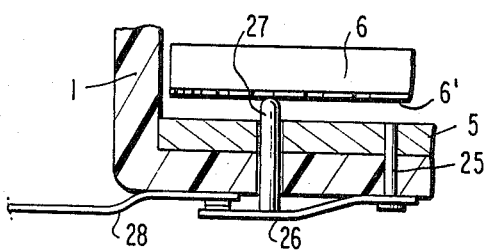
FIG.6
FIG.7
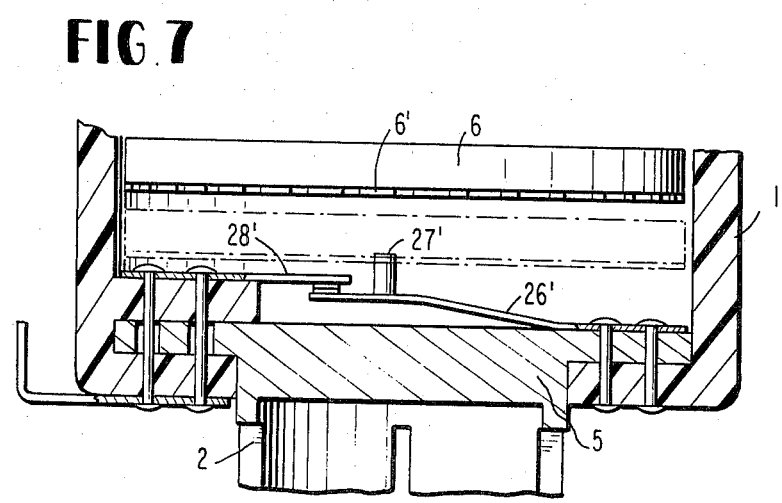

AUTOMATIC INERTIA ELECTRIC CIRCUIT-BREAKER

INTRODUCTION AND BACKGROUND OF THE INVENTION

The present invention relates to an automatic inertia electric circuit-breaker which upon the occurrence of a shock permits the instantaneous interruption of the electric current delivered by the battery of an automobile or any other vehicle equipped with a combustion engine.

In our earlier U.S. Pat. No. 3,743,803, July 3, 1973, we have proposed an automatic inertia electric circuit-breaker permitting the passage of a substantial current and adapted in the event of an accident to put out of circuit the whole electrical installation of a vehicle equipped with a combustion engine, embodying the features that it is constituted by a sealed electrically insulating housing in which is mounted a spherical inertia mass which in the event of a horizontal shock coming from any direction whatever leaves its seat by inertia, thus liberating a conducting plate which, impelled by springs, moves away from conducting contact lugs of large surface areas and interrupts the current, in that the spherical inertia mass is maintained at the centre of its wide angle (160° to 177°) seat by the intermediary of a pusher with a rounded head of small diameter which is loaded by a spring and exerts a downward pressure upon the inertia mass, in that the circuit-breaker comprises an inlet terminal mating with the terminal of the battery and thus permitting the fixing of the circuit-breaker upon one of the two terminals of the battery, and that the circuit-breaker comprises an outlet terminal similar to that of the battery and intended to receive the supply cable of the vehicle provided with its original connection thimble, and in that in its upper portion the circuit-breaker comprises a re-setting knob, manual traction upon the latter disengaging the pusher and permitting the inertia mass to resume its position upon its seat by the action of the force of gravity.

The circuit-breaker in accordance with our prior proposal, while functioning well, nevertheless necessitates for its correct cocking or re-setting that its position, that is to say the position of the vehicle, must not be inclined with respect to the horizontal, and that the re-setting knob must not be released before complete immobilisation of the inertia weight resting upon its seat.

One object of the present invention therefore is to provide an improved circuit-breaker which obviates the risk of incorrect cocking or re-setting.

BRIEF SUMMARY OF THE INVENTION

According to the present invention there is provided a circuit-breaker in accordance with our earlier above-identified patent and further characterised in that the re-setting knob is fixed to an intermediate piece provided with an annular channel in which engage the extremities of lever fingers pivotally mounted by means of pivots in the housing.

During its rotation the re-setting button causes the downward pivoting of the lever fingers, preferably four in number, which thus centre the inertia weight in a perfect manner and which resume their initial position when the circuit-breaker is reset or cocked ready for normal operation.

FURTHER DESCRIPTION AND ADVANTAGES OF THE INVENTION

According to a further feature of the invention the conducting plate upon which the inertia weight reposes carries flexible leaves attached to the conducting plate.

Finally, in conformity with a further feature of the invention the circuit-breaker is provided with one or more auxiliary contacts intended to complete the supply, in the case of disarming of the circuit-breaker in consequence of a shock, of visible or audible signal devices.

The following description relates to a manner of embodiment of the circuit-breaker in accordance with the invention, given by way of non-limitative example and explained with reference to the accompanying drawings.

BRIEF DESCRIPTION OF THE VIEWS IN THE DRAWING

In the accompanying drawings:

FIG. 5 is a bottom plan view of the conducting plate; and

FIGS. 6 and 7 are detail section views of parts of a circuit-breaker and illustrate two variations in the mounting of the auxiliary contact.

DETAILED DESCRIPTION OF THE PREFERRED EMBODIMENTS

Figure 1:
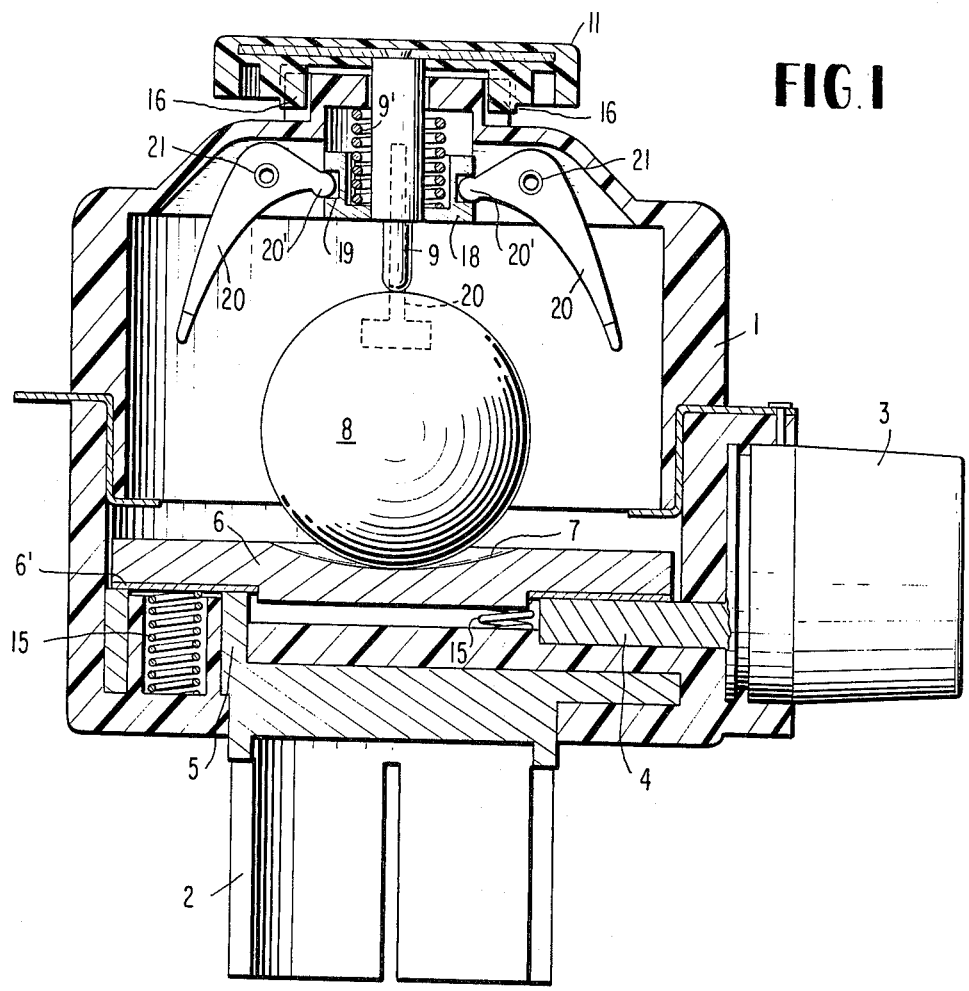
FIG. 1 is a sectional elevation of the circuit-breaker, in the armed position

Thus as illustrated in FIG. 1 of the accompanying drawings the re-setting knob 11 is secured to an intermediate piece 18 which is integral with the pusher 9.

In the intermediate piece 18 there is provided an annular recess 19 in which there engage the extremities 20' of four lever fingers 20 disposed at 90° with respect to one another and pivoted by means of pivots 21 in the housing 1.

Figure 2:
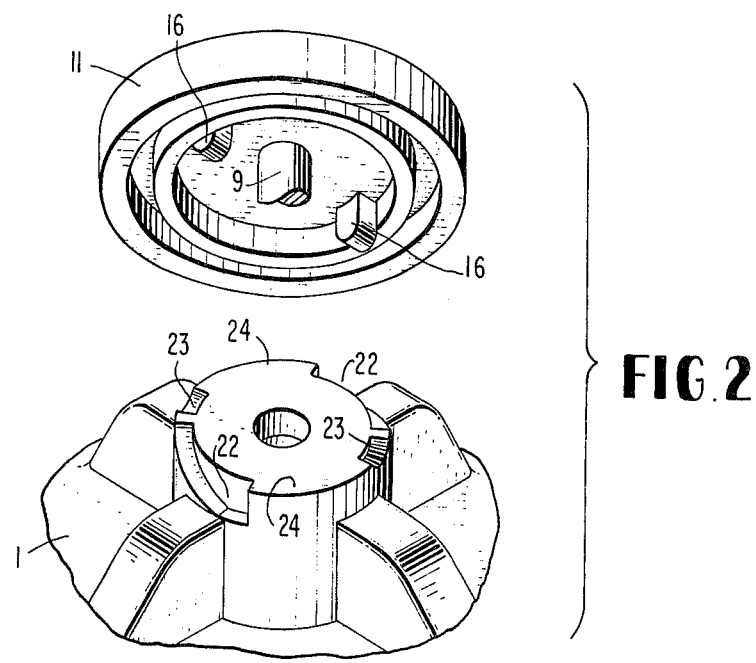
FIG. 2 is an exploded perspective view of the cam and re-setting know.
Figure 3:
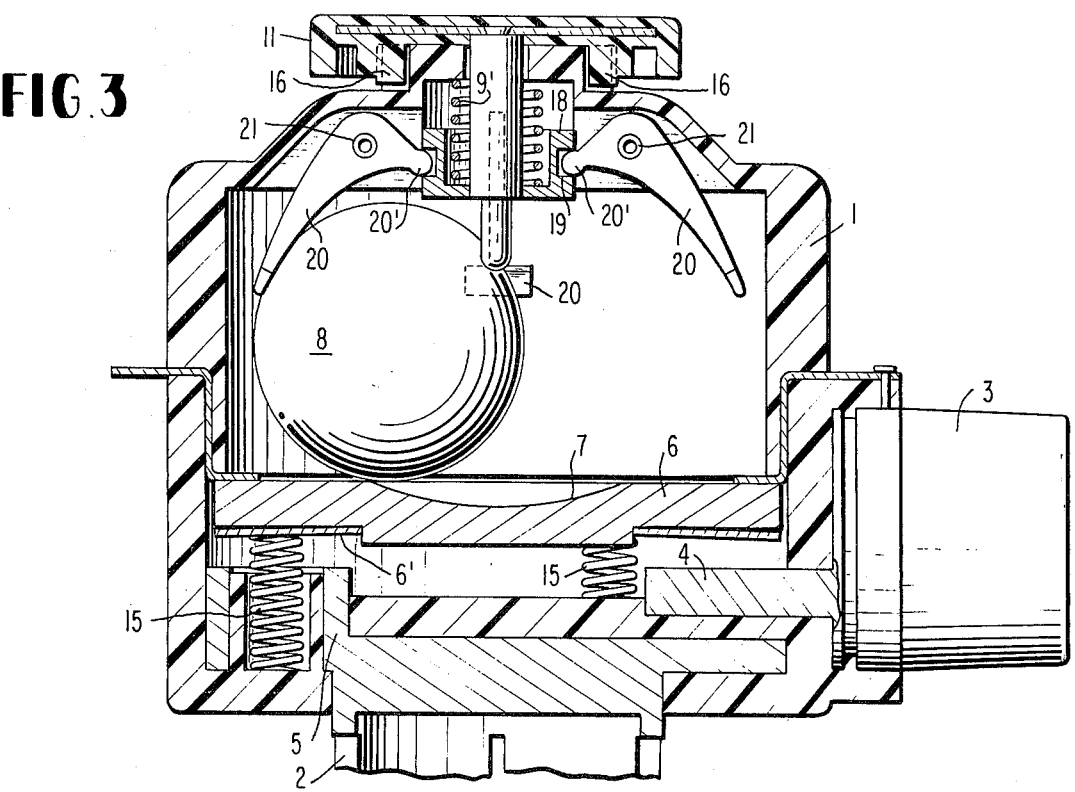
FIGS. 3 and 4 are views similar to FIG. 1 but showing the disarmed and partially re-armed positions, respectively.
Figure 4:
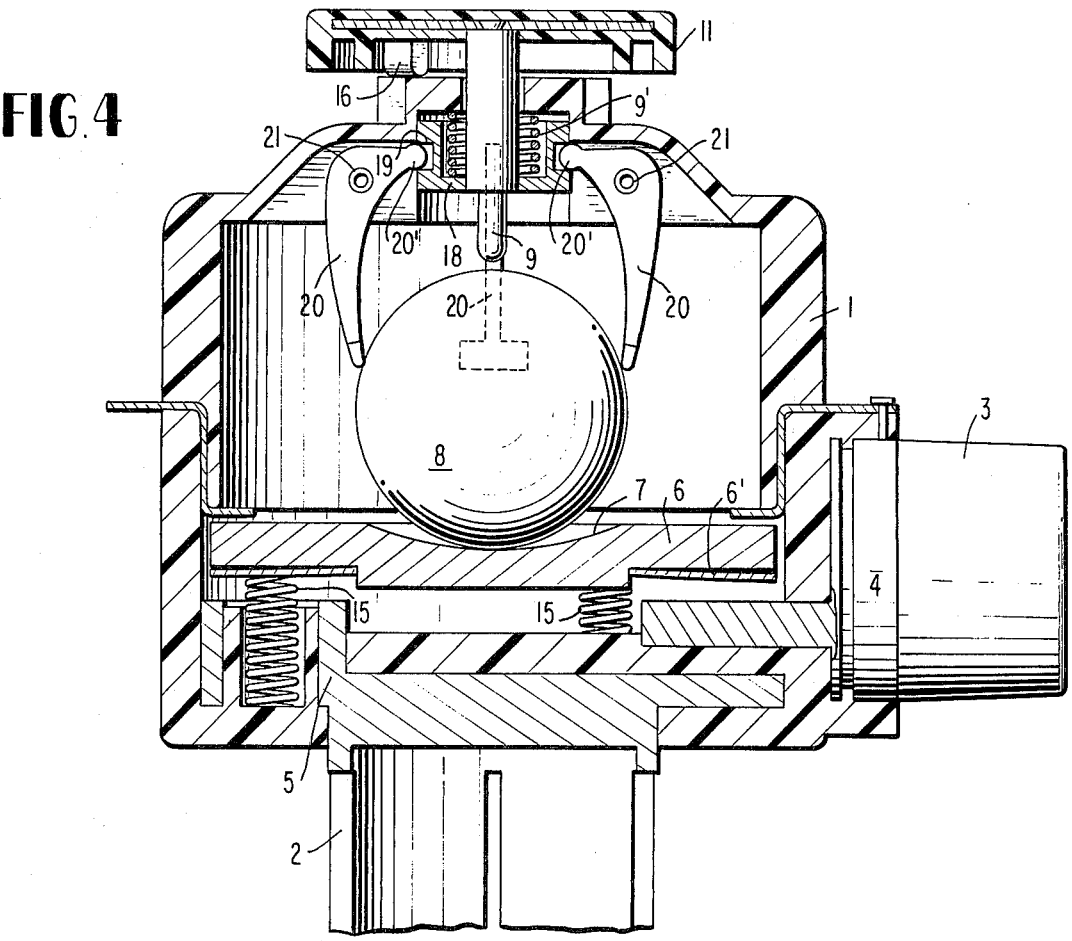

The upper surface of the housing 1 is formed in such a manner as to present a cam with two identical cam tracks, one of these cam tracks being represented in FIG. 2. By virtue of this double cam there is obtained, during the rotation of the re-setting knob 11 through 180°, in turn each of three different positions, namely, with the one part an armed or cocked position when the two diametrically-opposed projections 16 are in the lower parts or recesses 22, this being the position in which the intermediate piece 18 is situated nearest to the inertia weight 8 and in which the head of the pusher 9 urges the inertia weight 8 against the conducting plate 6 whilst completely disengaging the lever fingers 20; for the second part, an intermediate position when the two projections 16 are situated in the hollows 23, which has as its effect to liberate the inertia weight 8 and to cause a raising of the conducting plate 6 by the springs 15, therefore to disconnect the battery; and finally, for the third part, an armed or cocked position when the projections 16 are on the surfaces 24, in which position the intermediate piece 18 is situated in its highest position and in which the lever fingers 20 move towards one another and centre the inertia-weight 8.

In conformity with a further feature of the invention, and as shown in FIG. 5 of the accompanying drawings, the lower surface of the conducting plate 6 presents along its whole periphery flexible leaves 6 attached to the plate 6 and ensuring a better contact.

According to a further feature of the invention, the lower portion of the housing of the circuit-breaker is provided with an auxiliary contact intended to complete the supply of energy to visible or audible signals, especially in the event of an accident.

For this purpose, as represented in FIG. 6, in the base of the housing there is provided a conducting rivet 25 connected to a lug 4 or 5 and furnished with a leaf-spring 26. On this leaf-spring 26 there is fixed a stud 27 of insulating material extending through the base of the housing and the lug 4 or 5. Upon the external surface of the base of the housing there is moreover secured a leaf 28 connected to the visible or audible signal devices and intended to co-operate with the leaf-spring 26.

By way of variant, and as illustrated in FIG. 7, the leaf-spring 26', provided with a non-conducting pad 27', may be secured to the interior of the housing in order to cooperate with a leaf 28' connected to the visible or audible signal devices.

In the armed or cocked position of the circuit-breaker the conducting plate 6 is pressed downwards and pushes the stud 27 or the pad 27' which thus separates the two contacts 26 and 28 or 26' and 28' respectively. It is only in the event of shock, and therefore of disarming of the circuit-breaker, that is to say when the plate 6 is pushed upwardly, that the two contacts 26 and 28 or 26' and 28' respectively engage one another to complete the circuits of the various signal devices which may be provided.

It will be well understood that the invention is not limited to the manner of construction described and illustrated, but that various modifications may be introduced without departing from the scope of protection as defined in the following claims.

What is claimed is:

1. In an automatic inertia electric circuit-breaker permitting the passage of a substantial amount of current and adapted in the event of an accident to put out of circuit the whole electrical installation of a vehicle equipped with a combustion engine, comprising a sealed electrically insulating housing, a sphere adapted to roll in said housing and constituting and inertia mass which moves under the impetus of a horizontal shock from any horizontal direction, a conducting plate on which said sphere rolls, a shallow recess in the upper surface of said conducting plate, said sphere adapted to roll by gravity to the center of said recess, a presser having a convex rounded head of relatively small diameter, spring means urging said presser against said sphere in the direction of said center of said sphere when said sphere is at said center of said recess thereby releasably to retain said sphere in said recess, said circuit-breaker having fixed contact means adapted to be bridged by said conductive plate, contact terminal means configuratively connected to a terminal of said battery of said vehicle and the supply cable of said vehicle, and a manually operable resetting knob disposed outside said housing and manipulable to raise said presser to permit said sphere to return to said center of said recess; the improvement comprising an intermediate piece fixed to said resetting knob, said intermediate piece having an annular channel therein, lever fingers pivotally mounted intermediate their ends in said housing, one end of each said lever finger being disposed in said annular channel and the other end of each said lever finger coacting with the other said lever fingers on said sphere to move said sphere to said center of said recess upon resetting movement of said knob.

2. A circuit-breaker as claimed in claim 1, said knob having projections on the under side thereof that follow cam tracks of a cam on said housing, said cam tracks having three portions spaced apart different distances along the axis of said annular channel.

3. A circuit-breaker as claimed in claim 1, there being four said lever fingers equally spaced apart about the interior of said housing.

4. A circuit-breaker as claimed in claim 1, and flexible leaves secured to the underside of said conducting plate.

5. A circuit-breaker as claimed in claim 1, and an auxiliary contact in the lower portion of said housing, said auxillary contact comprising a leaf spring contact conductively in circuit with said fixed contact means, insulating material secured to the leaf spring contact and touching the conducting plate, and a leaf spring contact connected to an alarm device for cooperation with said auxillary leaf spring contact.

* * * * *